July 11, 1961
P. R. STOCK
2,991,669
WORK CLAMPING DEVICES
Filed April 11, 1960
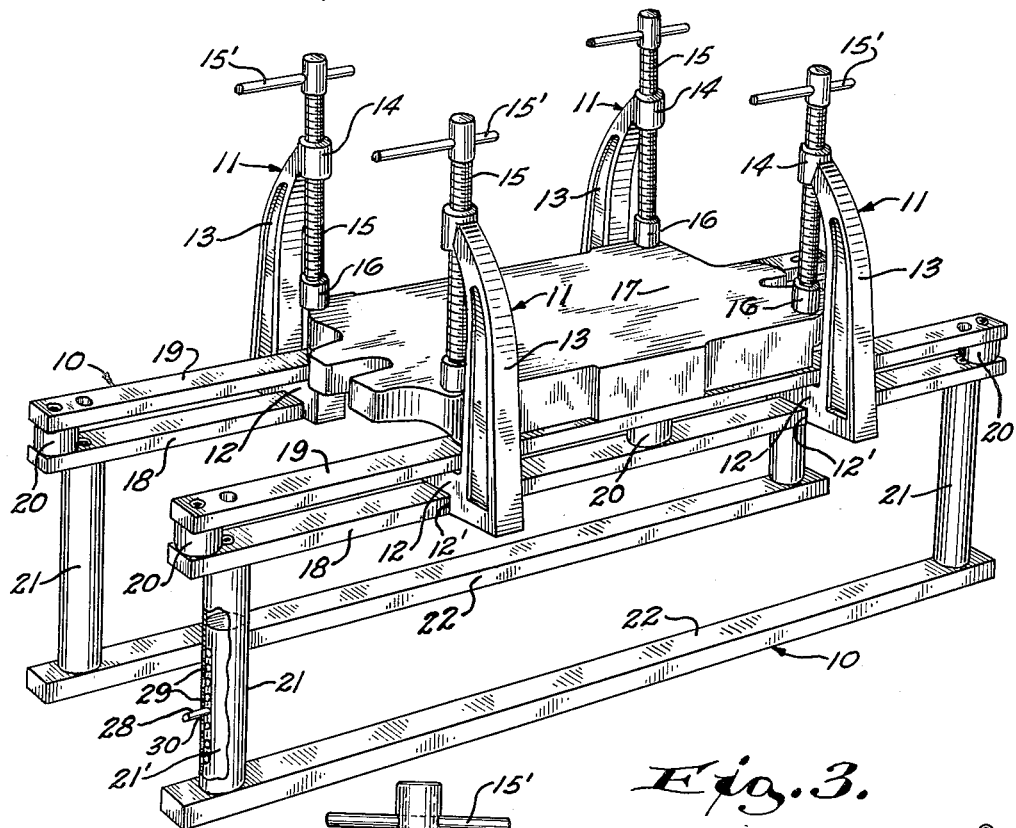
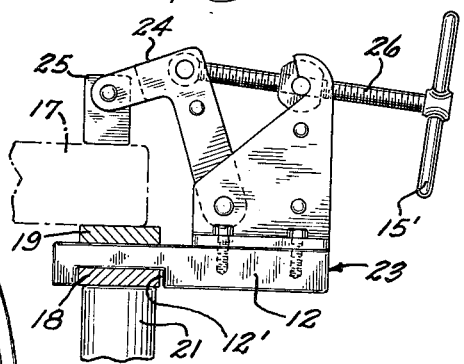
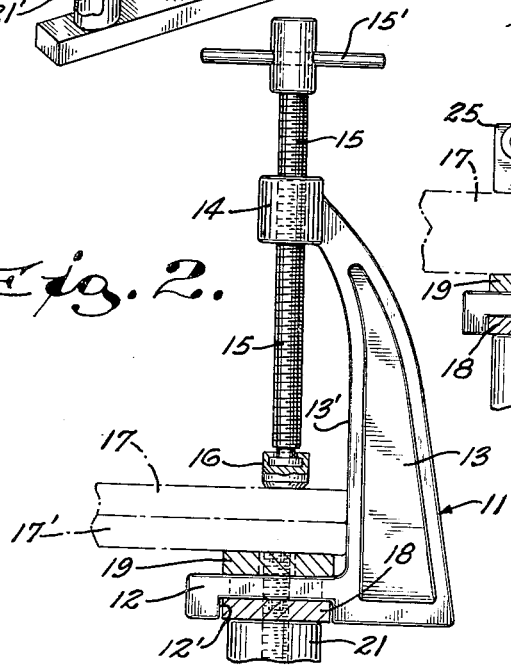
INVENTOR.
PHILIP R. STOCK
BY Morsell & Morsell
ATTORNEYS.

United States Patent Office 2,991,669
Patented July 11, 1961

2,991,669
WORK CLAMPING DEVICES
Philip R. Stock, 4236 N. Ardmore, Milwaukee, Wis.
Filed Apr. 11, 1960, Ser. No. 21,533
5 Claims. (Cl. 77—63)

This invention relates to improvements in work clamping devices, and more particularly to a work clamping device adapted to be adjustably mounted on the work-supporting table of a drill press or other metal or wood working tool for the purpose of holding the work in various selected positions relative to the tool.

Heretofore, in drill presses and similar machine tools, it has been customary to secure the work on the table or bed of the machine either by a common C-clamp, which clampingly engages both the table and the workpiece, or by means of integral clamp devices which are permanently mounted on the table, the latter type of clamp usually being slidably carried within a T-slot formed in the table surface. Both of these clamping arrangements have limitations, however, and are not entirely satisfactory. With ordinary C-clamps, for example, the clamps must be loosened and removed each time a workpiece is finished and it is difficult to clamp successive pieces in exactly the same position, which is important where several pieces are to be machined in an identical manner. Moreover, such C-clamps are only adjustable edgewise on the table and it is impossible to vary the position of the clamps laterally relative to the table edge, or to position the clamps at an angle thereto. With the second type of conventional clamping member, which is mounted within slots formed in the surface of the table, a certain amount of adjustment is permitted longitudinally within the slots but it is also impossible with this type of clamp to make lateral or angular adjustments. In addition, of course, a tool equipped with such permanent, or semi-permanent, clamps is relatively expensive.

With the above and other limitations of conventional clamping elements in mind, the general objects of the present invention are to provide a simple and inexpensive clamping apparatus which can be readily adjusted in any direction on a machine table, and which can be transferred from one machine to another as needed, thus eliminating the necessity for permanent expensive clamping fixtures on each machine.

A more specific object of the invention is to provide a work holding device comprising a pair of separate clamping units which are freely rested on the surface of the worktable, the workpiece being spanningly supported by and between said units, and which units are movable on the table surface to provide unlimited adjustability of the work relative to the tool.

A further object is to provide a clamping device as described, wherein a workpiece can be released and withdrawn without disturbing the position of the clamps on the table surface, thus permitting the clamping of successive pieces in exactly the same position.

A further object is to provide a work clamping device for use with metal or wood working machines, whereby the work is secured in an elevated position above the surface of the machine table, thereby avoiding the possibility of shavings or metal particles accumulating between and rubbing against the surfaces, and also eliminating the necessity for inverting and reclamping the workpiece in order to form a bore or cut completely therethrough, as is required with conventional clamping devices.

Still further objects of the present invention are to provide a work clamping device for machine tools which is of very simple construction, which is strong and durable, which is efficient in operation, and which device is well adapted for the purposes described.

With the above and other objects in view, the invention consists of the improved work clamping device for machine tools, and all of its parts and combinations as set forth in the claims, and all equivalents thereof.

In the accompanying drawings, showing the principal form of the invention and a modification thereof, and wherein the same reference characters designate the same parts in all of the views:

FIG. 1 is a perspective view of the complete clamping apparatus in engagement with a piece of work;

FIG. 2 is a side elevational view of one of the individual clamping members employed in the invention; and FIG. 3 is a side elevational view showing a modified form of clamping member.

Referring now to the drawings and particularly to FIG. 1, it will be seen that the improved clamping assemblage comprising the present invention includes a pair of separate standards or clamp-supporting frames which are indicated generally by the numeral 10. Unlike conventional workholding devices wherein the clamps are rigidly secured to the machine, said frames are freely rested on the surface of the worktable or bed of a machine tool (not shown) and are movable thereon to provide for unlimited adjustability of the clamps relative to the tool. Moreover, as shown in FIG. 1, the clamping units 11 carried by said frames are longitudinally movable thereon to permit adjustment of said clamps independently of the frames. The result is a work holding apparatus which is designed to accommodate workpieces of widely varying sizes and shapes, and wherein the work can be set in any desired position relative to the tool.

As will be seen in FIGS. 1 and 2, each of the clamping units 11 utilized in the principal form of the invention comprises a bracket which is generally L-shaped in form, and which includes an upright portion 13 which is curved inwardly toward its upper end to overhang the work, and a transverse, inwardly-projecting foot portion 12. The upper end of said upright 13 has an integral, internally threaded sleeve 14 thereon through which there extends in threaded relationship a screw shaft 15 disposed perpendicular to the surface of the worktable. A clamping head 16 is secured to the lower end of said screw, being adapted to bear against the workpiece 17 (FIG. 1), and the upper end of said screw shaft is provided with a turn-bar 15' or the like to facilitate turning of the clamping head into and out of engagement with the work, as will be described. Preferably the clamping units 11, like the other components of the present invention, are cast of high grade steel and the several matching members are accurately machined to provide virtual exactness of dimensions.

Each of the frame members 10 includes a pair of vertically-spaced apart, parallel bars 18 and 19 which form the uppermost elements of said frames, and between which the foot portions 12 of said clamping members are carried. As illustrated in FIG. 2, said clamping member feet have cut out portions 12' in their lower edge surface, to receive the lower parallel bars 18 and the top edge of each of said feet abuts the undersurface of the upper bar 19, said feet being securely retained by and between said bars but being longitudinally slidable therebetween. As shown in FIG. 1, said parallel horizontal bars 18 and 19 are secured together in spaced relation by means of cylindrical blocks 20 positioned at each end thereof and there being a third block centrally therebetween. In the use of the improved assemblage, opposite marginal portions of the workpiece 17 are rested on the flat top surfaces of the upper bars 19, being supported in spanning relationship by and between the frames 10, and pressurably held against said bars by means of the clamping screws 15.

Referring again to FIG. 1, it will be seen that the horizontal bars 18 and 19 of each frame member are supported on and by a pair of vertical tubular legs 21 which, in turn, are mounted on a base bar 22 which is adapted to rest directly on the surface of the machine table. The function of said leg members 21 is to elevate the clamping assemblage above the surface of the worktable or bed of the machine tool. With conventional work clamping devices, such as a common C clamp, wherein the workpiece is secured directly on and against the surface of the table, it is impossible to form a bore or cut completely through the work, for the reason that the tool would strike the surface of the table, and when such an operation is required, it is necessary to remove the clamps and invert the workpiece, boring inwardly from the opposite side to meet the bore initially started in the other face. This is inconvenient, of course, and moreover it is difficult to position the work with such precision that the oppositely directed bores or cuts communicate exactly.

A further disadvantage of conventional clamping devices, wherein the work is secured directly on the surface of the worktable, is that shavings, or metal particles falling onto the table accumulate and pack between the surface of the table and the work thereon, thereby effecting the vertical alignment of the work relative to the machine tool and also frequently scratching or marring the surface of the work. Moreover, with such conventional clamping devices, it is impossible to set and hold a piece of work having an irregular undersurface, since the clamping of the piece directly onto the worktable requires flat abutting surfaces. With the present invention, on the other hand, the mounting of the workpiece in spaced relation above the surface of the table eliminates these objections and provides an arrangement whereby a piece of any shape or contour may be securely clamped and retained in a selected position.

In the preferred form of the invention, the leg members 21 are telescopic in form, each having an elongated shank 21' (FIG. 1) slidably carried within said tubular leg 21 and rigidly secured to said base bar 22. A removable pin 28 is adapted to be projected through an aperture 30 in the leg 21 and into one of the openings 29 in the shank 21' to lock the leg at a selected height, the purpose, of course, being to provide height adjustability to promote the usefulness and convenience of the apparatus.

In the use of the improved clamping assemblage, the frame members 10 are first set on the worktable or bed of the machine tool and the threaded screw shafts 15 raised to permit insertion of the workpiece thereunder. Opposite marginal portions of the work 17 are then rested on the upper bar members 19, the work being supported by and between said separate frame members in spanning relation as described, said frame members being shifted on the table as required, and the clamping units 11 are moved longitudinally on said frames to positions adjacent the corners of the work. The screws 15 are then turned downwardly until the clamping heads 16 thereon are in firm engagement with said workpiece. The entire assemblage may then be shifted in any direction on the table until the work is positioned precisely as desired. If consecutive pieces are to be machined in an identical manner, a finished piece can be removed and replaced by merely raising the screws 15 and it is not necessary to move the frame members from their predetermined position relative to the tool.

It has been found that for some purposes the upstanding L-shaped supporting brackets and vertical clamping screws characterizing the principal form of the invention project too high into the air and interfere with the operation of the machine tool, and in such instances the modified form of clamping member illustrated in FIG. 3 might be preferred. In this form of the invention, the upright bracket 13 is replaced by a substantially shorter bracket and clamping member 23 which is known commercially as a "Can't Twist" clamp. Such a clamp utilizes a right angular pivotal arm 24 having a swiveled clamping head 25 on the outer end thereof, and has its screw shaft 26 disposed substantially horizontally, rather than vertically. Such a clamping member conserves space, of course, and might be preferred for this reason, but it is to be understood that the other members of the assemblage, as well as the operation thereof, are as hereinabove described and the device illustrated in FIG. 3 represents merely an alternative form of clamp which can be used in the present invention.

As will be readily appreciated from the foregoing description, the present invention provides an improved work-holding apparatus for use with drill presses or other metal or wood working tools wherein a workpiece may be easily adjusted in any direction relative to the tool. Moreover, the device is not fixed on the machine table and can be readily transferred from one machine to another as needed, thereby eliminating the necessity for an expensive permanent clamping fixture on each machine. Further, and as hereinbefore mentioned, a workpiece can be released and withdrawn without disturbing the predetermined position of the clamping members on the table, thus permitting the clamping of successive pieces in exactly the same location relative to the tool.

A still further advantage in the principal form of the improved clamping assemblage is that a plurality of plates or workpieces can be clamped together in stacked relationship, which is desirable where the pieces are to be identically cut or drilled. As will be seen in FIG. 2, the inner vertical edge 13' of the clamping member bracket is perfectly straight for a substantial portion of its length, permitting a pair of workpieces 17 and 17' to be positioned with their outer edges abutting said vertical inner bracket face 13', and thereby insuring that said pieces are accurately and precisely aligned. With a number of workpieces thus positioned and clamped, all of said pieces can be drilled in a single operation, which saves considerable time and labor, and substantially reduces the cost of manufacture.

It is to be understood, of course, that various changes and modifications may be made in the improved assemblage hereinabove described without departing from the spirit of the invention, and all of such changes and modifications are contemplated as may come within the scope of the following claims.

What I claim is:

1. A work holding device for use on the work supporting table of a machine tool comprising: a pair of separate frame members mountable on said table, each of said frame members having a pair of vertically spaced apart, horizontal parallel bars thereon, the upper bar on each frame having a flat top surface on which a marginal portion of a piece of work can be rested, such a workpiece being spanningly supported by and between said frame members; and clamping units mounted on and longitudinally movable between said parallel bars, said clamping units having means thereon for releasably clampingly engaging a piece of work supported on said upper parallel bars.

2. A work holding device for use on the work supporting table of a machine tool comprising: a pair of separate frame members mountable on said table, each of said frame members having a pair of vertically spaced apart, horizontal parallel bars thereon, the upper bar on each frame having a top surface on which a marginal portion of a piece of work can be rested, such a workpiece being spanningly supported by and between said frame members; and a pair of clamping units mounted on each of said frame members, said clamping units including a foot portion slidably retained by and between said frame member parallel bars, and said clamping units having means thereon for releasably clampingly engaging a piece of work supported on said upper parallel bars.

3. An adjustable work holding device for use on the work supporting table of a machine tool, comprising: a pair of separate frame members mountable on said table, each of said frame members having a pair of vertically-spaced apart, horizontal parallel bars thereon, the upper bars having flat top surfaces on which opposite marginal portions of a piece of work can be rested, such a workpiece being spanningly supported by and between said frame members; and a pair of clamping units mounted on each of said frame members, said clamping units including a bracket having an upright portion and a transverse foot portion slidably retained by and between said frame member parallel bars, the slidable nature of said bracket feet between said bars permitting longitudinal movement of said clamping units therealong, and means on said bracket upright portions for releasably clampingly engaging a piece of work supported on said frame members.

4. An adjustable work holding device for use on the work supporting table of a machine tool, comprising: a pair of separate frame members mountable on said table, each of said frame members having a horizontal base bar, having a pair of vertically adjustable legs projecting upwardly from said base bar, and each of said frames having a pair of vertically-spaced apart, horizontal parallel bars carried by and between the upper ends of said legs, the upper bars having flat top surfaces on which opposite marginal portions of a piece of work can be rested, such a workpiece being spanningly supported by and between said frame members; and a pair of clamping units mounted on each of said frame members, said clamping units including a bracket having an upright portion and a transverse foot portion slidably retained by and between said frame member parallel bars, the slidable nature of said bracket feet between said bars permitting longitudinal movement of said clamping units therealong, and screw means on said bracket upright portions for releasably clampingly engaging a piece of work supported by and between said frame member upper parallel bars.

5. An adjustable work holding device for use on the work supporting table of a machine tool, comprising: a pair of separate frame members freely mountable on the surface of said table, each of said frame members having a horizontal base bar, having a pair of vertically adjustable telescopic legs projecting upwardly from said base bar, there being means on said legs for locking the same in a selected position of vertical adjustment, and each of said frames having a pair of vertically-spaced apart, horizontal parallel bars carried by and between the upper ends of said legs, the upper bars having flat top surfaces on which opposite marginal portions of a piece of work can be rested, such a workpiece being spanningly supported by and between said frame members; and a pair of clamping units mounted on each of said frame members, said clamping units including an L-shaped bracket having an inwardly curved upright portion with an internally threaded, vertically disposed sleeve on its upper end and a transverse foot portion on its lower end slidably retained by and between said frame member parallel bars, the slidable nature of said bracket feet between said bars permitting longitudinal movement of said clamping units therebetween, an elongated screw shaft extended through said threaded sleeve, and a clamping head on the lower end of each of said screw shafts for releasably clampingly engaging a piece of work supported on and between said frame member upper parallel bars.

References Cited in the file of this patent

UNITED STATES PATENTS

| | | |
|---|---|---|
| 2,334,127 | Ringzelli | Nov. 9, 1943 |
| 2,364,150 | Lowenstein | Dec. 5, 1944 |